United States Patent
Scheffe et al.

(10) Patent No.: US 7,377,696 B2
(45) Date of Patent: May 27, 2008

(54) DEVICE FOR INFLUENCING IN A CONTROLLED MANNER THE LOAD PRESSURE OF PRESSURE ROLLERS

(75) Inventors: Kurt Scheffe, Hilchenbach (DE); Karl Keller, Hilchenbach (DE); Achim Klein, Kreuztal (DE); Michael Breuer, Hilchenbach (DE); Jörn Sohler, Kreuztal (DE)

(73) Assignee: SMS Demag AG, Düsseldorf (DE)

( * ) Notice: Subject to any disclaimer, the term of this patent is extended or adjusted under 35 U.S.C. 154(b) by 93 days.

(21) Appl. No.: 10/509,858

(22) PCT Filed: Apr. 30, 2003

(86) PCT No.: PCT/EP03/04501

§ 371 (c)(1),
(2), (4) Date: Oct. 1, 2004

(87) PCT Pub. No.: WO03/099478

PCT Pub. Date: Dec. 4, 2003

(65) Prior Publication Data

US 2005/0254737 A1 Nov. 17, 2005

(30) Foreign Application Priority Data

May 29, 2002 (DE) .............................. 102 23 864
Dec. 30, 2002 (DE) .............................. 102 61 758

(51) Int. Cl.
*F16C 13/02* (2006.01)
(52) U.S. Cl. ...................................... 384/587; 384/418
(58) Field of Classification Search ................ 384/256, 384/247, 418, 419, 546, 583, 587; 72/237–239, 72/245, 247, 241.2, 242.2, 242.4
See application file for complete search history.

(56) References Cited

U.S. PATENT DOCUMENTS

| 1,986,027 | A | * | 1/1935 | Talbot ........................ 384/418 |
| 3,171,305 | A |   | 3/1965 | Stone |
| 3,347,157 | A | * | 10/1967 | Kemp ........................ 384/418 |
| 3,717,021 | A |   | 2/1973 | Gross |
| 4,406,139 | A | * | 9/1983 | Schiffers ...................... 68/258 |
| 5,029,461 | A | * | 7/1991 | Lawrence et al. ............ 72/238 |
| 6,149,309 | A | * | 11/2000 | Wojtkowski et al. ....... 384/419 |

FOREIGN PATENT DOCUMENTS

DE    1281981    8/1959

\* cited by examiner

*Primary Examiner*—Thomas R Hannon
(74) *Attorney, Agent, or Firm*—Friedrich Kueffner

(57) ABSTRACT

Disclosed is a device for influencing in a controlled manner the load-bearing force of supporting rollers (SW) that rest on working rollers. The neck (WZ) of said supporting rollers (SW) which is provided with an extension (ZA) is mounted in roller bearings or sliding bearings that are disposed in a bearing-supporting housing of the rollers of a roller stand. The neck extension (ZA) is mounted in a supporting bearing. The outside of the housing (LG) of said supporting bearing is connected to the bearing-supporting housing. An intermediate housing (ZG) which is inserted in the housing (LG) of the supporting bearing cylindrically encloses the supporting bearing, is impinged upon by a piston cylinder unit (RB, SK), and can be displaced within said housing (LG) in a radial direction relative to the axis of the neck extension (ZA).

2 Claims, 2 Drawing Sheets

DEVICE FOR INFLUENCING IN A CONTROLLED MANNER THE LOAD PRESSURE OF PRESSURE ROLLERS

The invention concerns a device for controlling the contact pressure of contact rolls, especially backup rolls resting on work rolls.

Rolls of this type are supported with their necks in journal bearings or roller bearings, which, in the case of backup rolls, are supported by bearing chocks guided in the roll housings. One or both of the necks have an extension, which is supported in an axial support bearing, whose bearing housing is joined to a support housing or bearing chock of the contact roll or backup roll.

In previously known multi-high stands, the backup rolls and the work rolls are supported in bearing chocks, which are guided in the windows of the housing of the roll stands. The backup rolls rest a certain distance apart against the work rolls, which are adjustably supported to form the roll gap, which can be varied and determined by controlled bending of the work rolls.

When sheets are rolled, especially those of considerable width, backup rolls with long barrels must be used, which are very heavy. These backup rolls must be balanced over their length so that they interfere as little as possible with the effect of the bending forces acting on the work rolls to form the roll gap profile. The balancing of the backup rolls must be done in such a way that the flow of forces between the backup roll and work roll is maintained over the entire contact length of the two rolls during rolling without interruption (gapping); this includes especially the case of a rapid increase or a similarly rapid decrease in the rolling force, which occurs, for example, when these types of rolling stands reverse their direction. The repeated load reversals and no-load operating phases subject the bearings to stresses, which, when roller bearings are used, have an effect on the rolling elements or possibly, depending on the load distribution, on only some of the rolling elements. When journal bearings are used, the stresses have a similar effect on their bearing surfaces and can lead to damage.

In addition, in the case of large, wide rolling stands, the backup rolls, with their correspondingly long axes, reach weights that are greater than would be necessary to produce the required contact forces between the rolls, with the result that, in this case, the forces applied to bend the work roll must be set higher than is actually necessary. This means in turn that a portion of the bending forces provided to control the profile of the roll gap cannot be effectively utilized.

Therefore, these fluctuations in the rolling forces, which occur in the rolling process during the pass itself, require fast and precise control of the balancing of the backup rolls.

Problems similar to the difficulties described above are encountered in connection with the pairs of strip drive rolls during the processing of rolled strip. The circumferential surfaces of the roll lying on the surface of the strip and of the roll below it are often damaged, because the upper roll resting on the strip drops suddenly toward the lower roll when the tail end of the strip exits the roll gap.

It has already been proposed that the backup rolls be balanced by applying bending forces to a suitably designed neck of the roll, and that the upwardly-acting component of these forces be absorbed by a support beam installed above the roll and parallel to it. This type of installation is necessarily very tall, however, and thus requires housings and housing windows of considerable height. This leads to comparatively high and heavy stands, and it also means that the backup roll itself must be extended axially to the side.

The goal of the invention is to develop a device that makes it possible to eliminate the problems explained above. To this end, starting from previous designs of neck bearings, in which the necks of backup rolls or of contact rolls, which are supported in the bearing chocks of rolling stands or suitable bearing support housings, have a neck extension, which is supported in an axial support bearing, whose bearing housing is connected externally to the bearing chock of the rolling stand or the bearing support housing, the invention proposes that an intermediate housing be provided, which is inserted into the bearing housing and cylindrically encloses the axial support bearing, and which, when acted upon by a piston-cylinder unit, can be adjustably displaced in the bearing housing in the radial direction relative to the axis of the neck extension, and that with this system, bending forces can be applied to a backup roll or to the contact rolls by controlled adjusting displacements of the intermediate housing and thus of the neck extension supported in it.

The invention further provides that the piston-cylinder unit can consist of an internal cylindrical recess, which extends radially relative to the axis in the wall of the bearing housing that encloses the intermediate housing, and of a floating piston, which can be displaced in this cylindrical recess and which can be actuated by a hydraulic medium. In one design of the device, in which the neck is supported in a journal bearing in the bearing chock of a backup roll, the journal bearing can be designed as a hydraulic oil film bearing (Morgoil® bearing).

With the device described above, which can be easily built into existing bearings of backup rolls or contact rolls without a great deal of technical resources, the forces to be applied to the backup rolls or contact rolls can be controlled in a simple way with the use of the very simply designed piston-cylinder unit and commercially available hydraulic control devices.

The invention is explained below with reference to the embodiments illustrated in the drawings.

Figure 1:
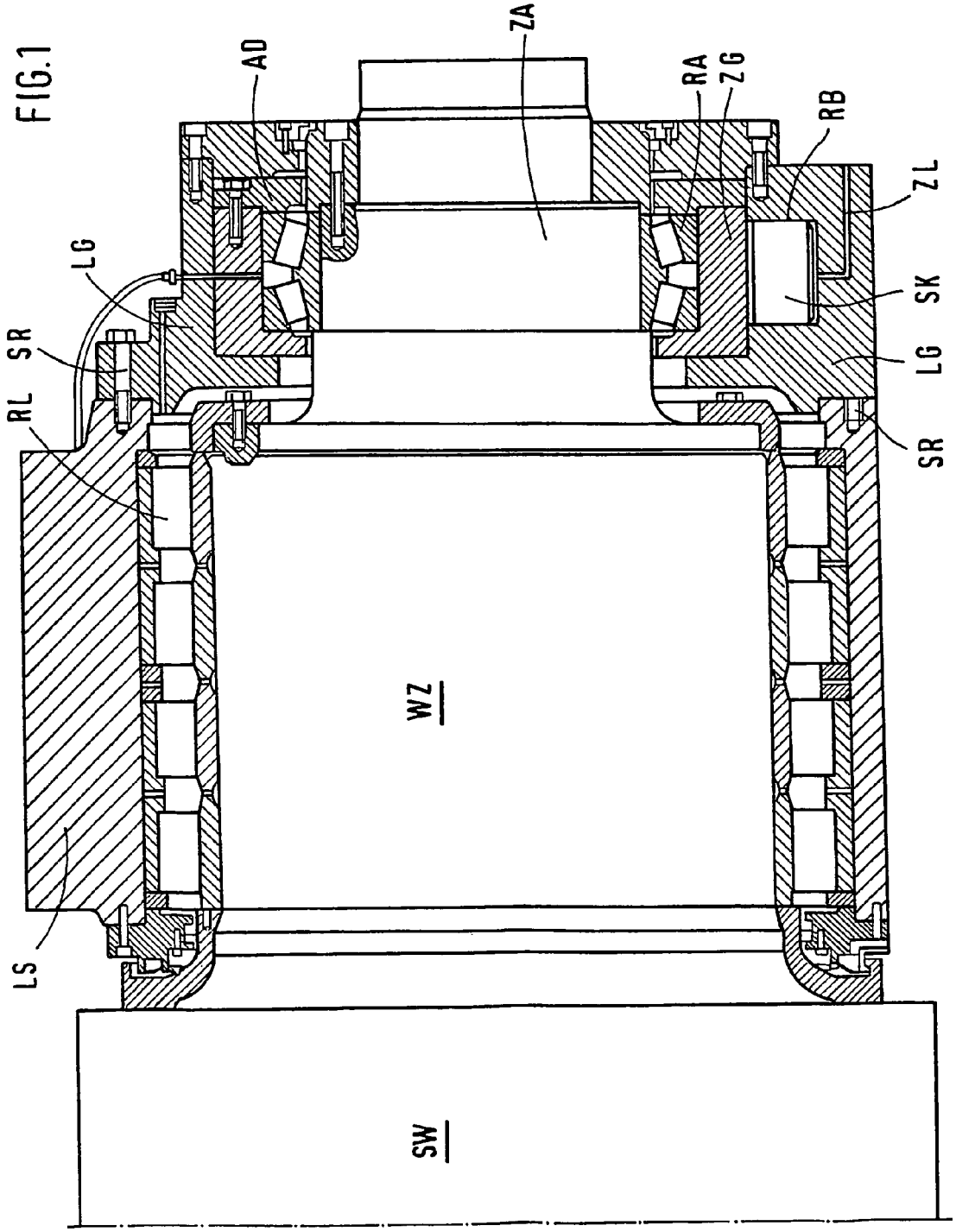
FIG. 1 shows a radial section through roll neck with its bearing.

As FIG. 1 shows, the roll neck WZ of the backup roll SW is supported by a roller bearing RL in the bearing chock LS and has a neck extension ZA, which is supported in an axial support bearing in the form of a radiax bearing RA. This radiax bearing RA is enclosed in a ring-like manner by an intermediate cylindrical housing ZG, which is inserted with radial clearance in a cylindrical recess of the bearing housing LG, which rests against and is connected to the bearing chock LS by screws SR. The intermediate housing ZG is sealed with a cover AD on the side facing away from the roll neck WZ. In the wall of the bearing housing LG that encloses the intermediate housing ZG, a floating piston is installed in a bore RB, which extends radially relative to the axis. The hydraulic medium feed line ZL of a controlled hydraulic pressure generator (not shown) opens into the bore RB that extends radially relative to the axis, below the floating piston SK.

By means of the hydraulic medium, which is introduced into the radial bore RB through the feed line ZL and acts on the bottom surface of the piston SK, the intermediate housing ZG and thus the neck extension ZA are pushed upward by a predetermined amount. As a result, the center axis of the backup roll SW is deflected, and a corresponding change is achieved in the support surface of the drop of this backup roll relative to the work roll (not shown).

Figure 2:
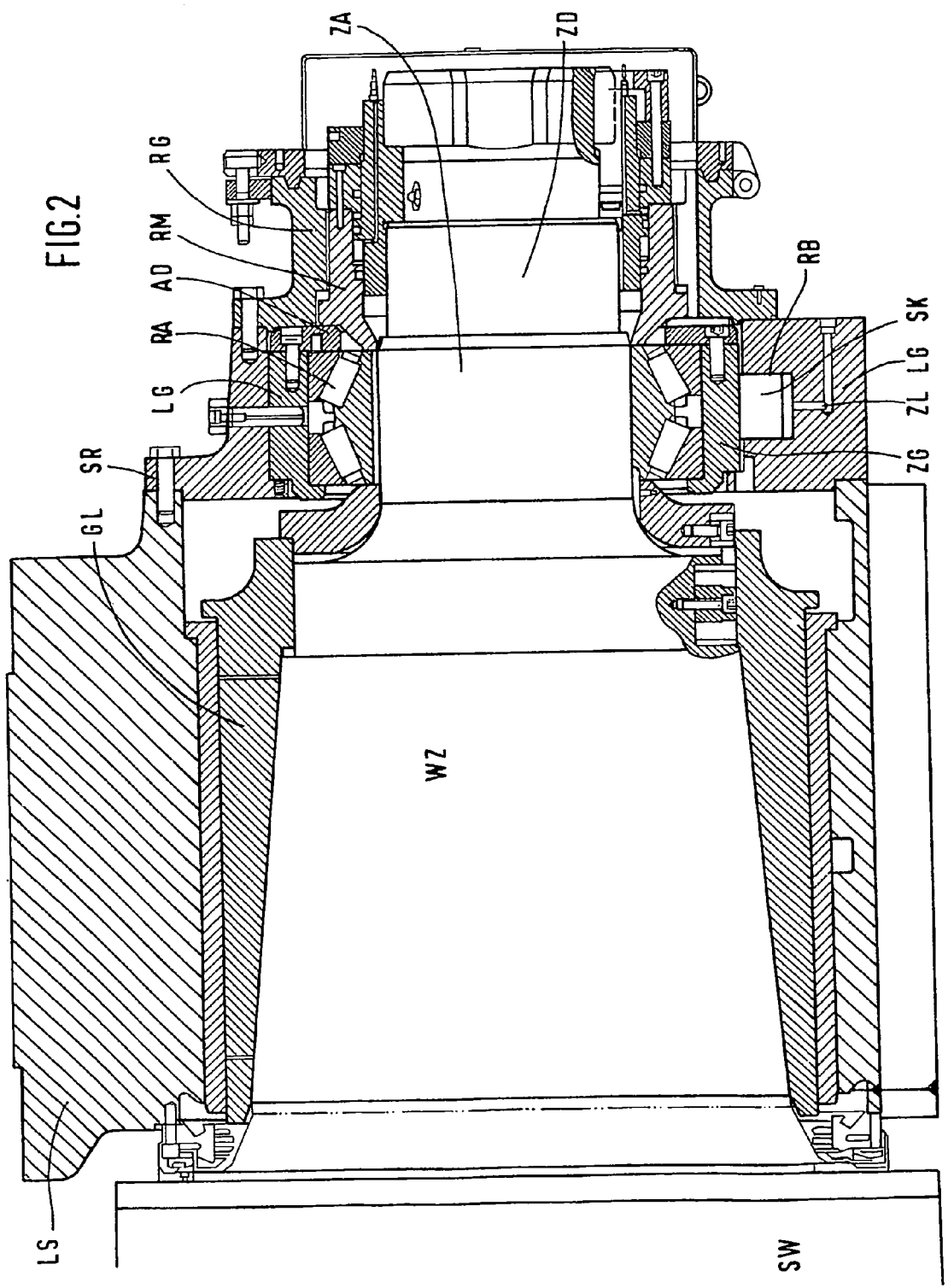
FIG. 2 shows a radial section through the roll neck of a backup roll with a bearing of different design.

FIG. 2 shows a system similar to that shown in FIG. 1, in which a journal bearing GL in the form of an oil film bearing is slid onto the neck WZ of the backup roll SW. A ring-like housing RG is slid onto a second neck extension ZD, which proceeds from the first neck extension ZA. The housing rests against the cover AD and the bearing housing LG and is connected to the bearing housing LG. This ring-like housing carries a ring gasket RM for the oil film bearing.

List of Reference Letters

RL roller bearing
GL journal bearing
LS bearing chock
WZ roll neck
SW backup roll
ZA neck extension
ZD (second) neck extension
RA radiax bearing
LG bearing housing
ZG intermediate housing
SR screw
AD cover
RB bore (extending radially relative to the axis)
SK (floating) piston
ZL (hydraulic) feed line
RG ring-like housing
RM ring gasket

The invention claimed is:

1. Device for controlling the contact pressure of backup rolls (SW) resting on work rolls, whose neck (WZ) is supported in roller bearings or journal bearings in a bearing support housing or the bearing chock of the rolls of a roll stand, the neck having a neck extension (ZA), which is supported in an axial support bearing formed as a radiax bearing (RA), the axial support bearing having a bearing housing (LG) is connected externally to the bearing support housing of the contact rolls or to the bearing chock (LS) of the backup rolls, comprising an intermediate housing (ZG), which is inserted into the bearing housing (LG) and cylindrically encloses the radiax bearing (RA), and a piston-cylinder unit (RB, SK) operatively arranged for adjustably displacing the intermediate housing in the bearing housing in the radial direction relative to the axis of the neck extension (ZA), wherein the piston-cylinder unit includes a piston (SK) arranged in a radial bore (RB) in the bearing housing (LG), the piston (SK) being connected with a pressure fluid via the bore (RB), whereby the piston (SK) applies a radial bending force to the neck extension (ZA) of the roll (SW).

2. Device according to claim 1, in which the neck of the backup roll is supported in a journal bearing in the bearing chock, wherein the journal bearing is designed as a hydraulic oil film bearing.

* * * * *